(12) United States Patent
Minai

(10) Patent No.: US 6,682,146 B2
(45) Date of Patent: Jan. 27, 2004

(54) STRUCTURE OF SEAT CUSHION FRAME IN VEHICLE SEAT

(75) Inventor: Masamitsu Minai, Tokyo (JP)

(73) Assignee: Taichi-S Co., Ltd., Tokyo (JP)

( * ) Notice: Subject to any disclaimer, the term of this patent is extended or adjusted under 35 U.S.C. 154(b) by 27 days.

(21) Appl. No.: 09/994,695

(22) Filed: Nov. 28, 2001

(65) Prior Publication Data

US 2003/0098601 A1 May 29, 2003

(51) Int. Cl.[7] .................................................. B60N 2/02
(52) U.S. Cl. ........................... 297/354.12; 297/354.13; 297/216.15
(58) Field of Search ..................... 297/354.12, 354.1, 297/452.2, 354.13, 216.15, 344.1, 344.11

(56) References Cited

U.S. PATENT DOCUMENTS

| | | | | |
|---|---|---|---|---|
| 4,793,653 A | * | 12/1988 | Kanazawa | |
| 5,050,932 A | * | 9/1991 | Pipon et al. | |
| 5,722,731 A | * | 3/1998 | Chang | |
| 5,746,476 A | * | 5/1998 | Novak et al. | |
| 5,938,265 A | * | 8/1999 | Obayu et al. | |
| 6,010,195 A | * | 1/2000 | Masters et al. | |

FOREIGN PATENT DOCUMENTS

JP     11-244088     9/1999

* cited by examiner

Primary Examiner—Laurie K. Cranmer
(74) Attorney, Agent, or Firm—Browdy and Neimark

(57) ABSTRACT

A structure of seat cushion frame including a pair of side frame members and a square backward frame member connected between the two side frame members. In this structure, a reclining device is securely attached to predetermined securing points in each of the two side frame members, wherein such predetermined securing points are defined on the opposite sides of a central axis of the square backward frame member and also disposed on the same level with or adjacent to that central axis. Hence, a great load imparted from the reclining device is not directly exerted on the side frame members, but smoothly escaped to the square backward frame, thereby protecting the side frame members against deformation.

12 Claims, 3 Drawing Sheets

STRUCTURE OF SEAT CUSHION FRAME IN VEHICLE SEAT

BACKGROUND OF INVENTION

1. Field of the Invention

The present invention generally relates to a structure of a vehicle seat, and in particular to a structure of seat cushion frame in the vehicle seat.

2. Description of Prior Art

Among vehicle seats, there is known a bench seat on which at least two passengers can sit. Such bench seat includes a seat cushion frame which is generally of a rectangular shape comprising a forward frame member, a backward frame member and a pair of side frame members connected between the forward and backward frame members. In some bench seats, each of their backward frame members employs a square frame member having a rectangular cross-section to give a reinforcement effect enough to withstand a great backward load applied to the seat cushion frame.

Conventional seat cushion frame of this sort is of such a construction wherein a pair of vertically extending plate-like side frame members are at their respective backward end portions fixedly connected as by welding to the respective two ends of the square backward frame member, and a tubular forward frame member is firmly connected between the two forward end portions respectively of those two plate-like side frame members. Also, a pair of reclining devices are provided in this cushion frame such that the two lower arms of the reclining devices are each fastened to the respective two backward end regions of the two plate-like side frame members.

According to that conventional seat cushion frame, both two lower arms of the reclining devices are situated at a point above the afore-said square backward frame member and also each of such two lower arms is fastened to each outer surface of the two plate-like side frame members. Dynamically, it therefore follows that, when a great load is applied in a backward direction to a seat back frame which is connected via the reclining devices to the seat cushion frame, the great load is transmitted via the two lower arms of the reclining devices to both two side frame members of the seat cushion frame. This will result in the two side frame members being deformed and broken due to the great load, and thus, there is a need to reinforce the side frame members themselves by fixing a reinforcement plate or the like thereto. However, such additional reinforcement will increase the weight of the seat cushion frame.

SUMMARY OF THE INVENTION

With the above-stated drawbacks in view, it is therefore a primary purpose of the present invention to provide an improved structure of seat cushion frame which is light-weight and simplified, while protecting its two side frame members against deformation due to a great load applied thereto.

To achieve such purpose, the structure of seat cushion frame in accordance with the present invention basically comprises:

- a forward frame member which faces to a forward side of seat cushion frame;
- a square backward frame member having a generally rectangular cross-section, which faces to a backward side of seat cushion frame;
- a pair of side frame members, each having a vertically extending wall area, said pair of side frame members being securely connected between the forward frame member and square backward frame member; and
- a reclining means having a pair of lower arms;
- wherein each of the pair of lower arms is fixedly secured to each of the pair of side frame members at securing points defined on the foregoing forward and backward sides in relation to a central axis of the square backward frame member, and wherein such securing points are disposed on the same level with or adjacent to the central axis of square backward frame member.

Accordingly, when a great backward load is applied to the seat back frame, the load is dispersed via the lower arms of reclining means, and simultaneously, downward force components are generated form the load and exerted upon the above-stated two securing points. Such downward force components are immediately transmitted via the two side frame members to the square backward frame member, whereupon most of the great load is received by the square backward frame member and immediately transmitted to the connecting means and escaped in a direction to a vehicle floor. Thus, the great load is not directly exerted on the side frame members, but smoothly transmitted to the square backward frame member, thereby preventing deformation of the seat cushion frame and eliminates the need for reinforcing the same.

Preferably, the afore-said securing points may be defined at backward end areas respectively of the pair of side frame members, and at least two bolts are used to secure said pair of lower arms at said securing points to the vertically extending wall area of each of the two side frame members.

In one aspect of the present invention, the connecting means may be provided between the square backward frame member and the floor of vehicle, so that the great load is escaped through the square backward frame member and the connecting means down to the floor of vehicle.

In another aspect of the present invention, the structure of seat cushion fame may be combined with a slide rail device to be fixed on the floor vehicle, and the connecting means may be provided between the square backward frame member and the slide rail device, so that the great load is escaped through the square backward frame member, the connecting means and the slide rail device, down to the floor of vehicle Other features and advantages of the present invention will become apparent from reading of the description hereinafter, with reference to the annexed drawings.

DETAILED DESCRIPTION OF PREFERRED EMBODIMENT OF THE PRESENT INVENTION

Referring to FIGS. 1 through 4, there is illustrated one exemplary mode of a framework of beach seat for vehicle in accordance with the present invention.

The shown mode of bench seat framework is comprised of a seat cushion frame (1); a seat back frame (4); a pair of reclining devices (2); and a slide rail device (3).

Figure 1:
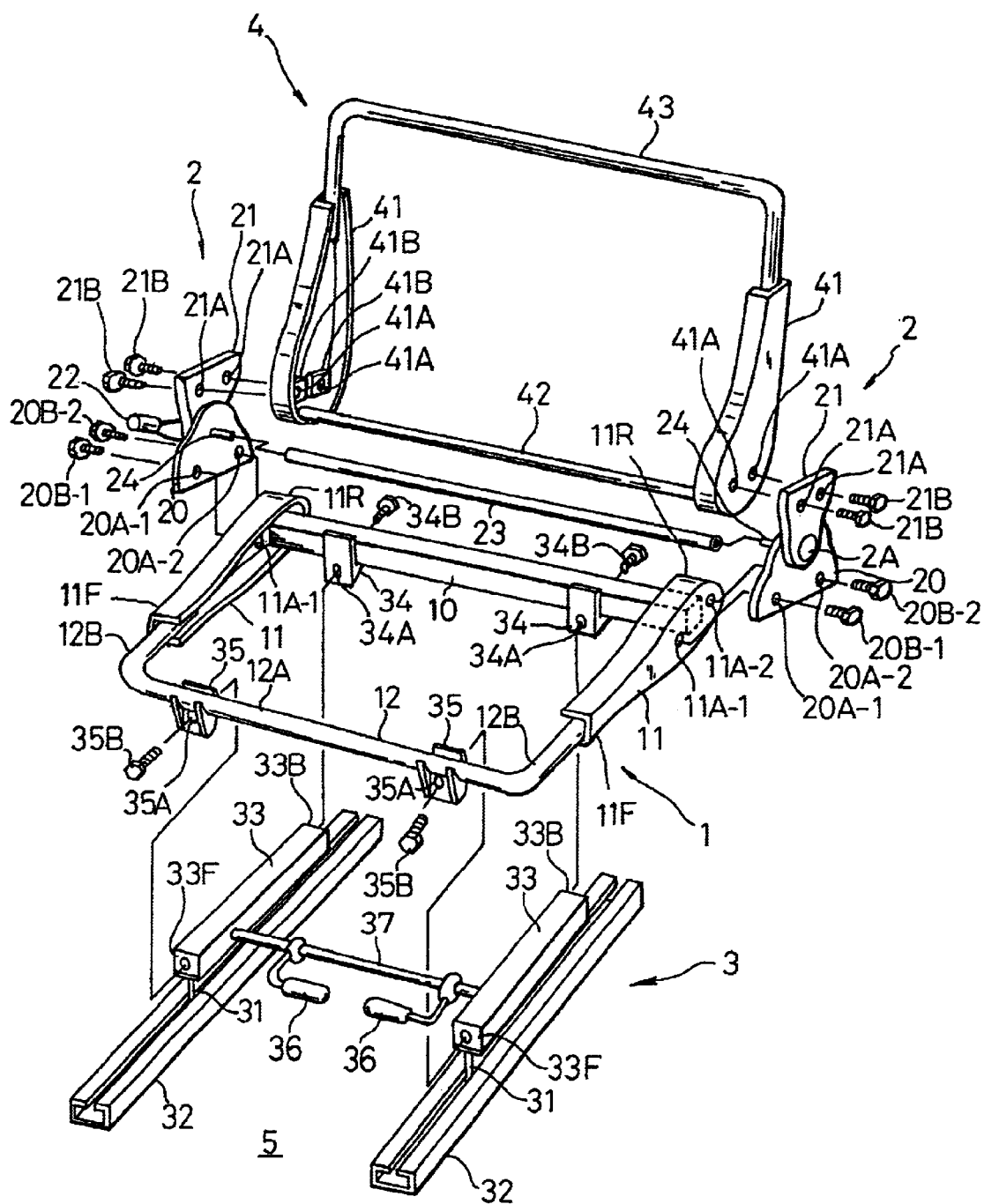
FIG. 1 is a schematic exploded perspective view of a vehicle seat framework including a seat cushion structure in accordance with the present invention.

The seat back frame (4) is formed in a rectangular shape by connecting a U-shaped upper frame member (43) with a pair of side frame members (41) (41) while connecting a lower frame member (42) therewith. As shown in FIG. 1, each of the two side frame members (41) is formed with a pair of through-holes (41A) (41A) therein and provided with a pair of securing nuts (41B) (41B) at the inward walls thereof, each of the nuts (41B) having a hole coaxially aligned with each of the two through-holes (41A) (41A).

The seat cushion frame (1) is also formed in a rectangular shape by: a U-shaped forward frame member (12) having a main frame section (12A) and a pair of lateral frame sections (12B) (12B); a pair of side frame members (11) (11); and a known square backward frame member (10) having a rectangular cross-section, which has been described earlier. Each of the two side frame sections (11) is of a generally channel cross-section having a narrow forward end region (11F) and a vertically widened backward end region (11R). In particular, the backward end region (11R) includes a vertical wall area (11R-1) (see FIGS. 2 and 3) to which is fixedly attached the end of the square backward frame member (10) as will be described later. Each side frame section (11) is, at its backward end region (11F), formed with a pair of spaced-apart forward and backward securing holes (11A-1) (11A-2). As can be best seen from FIG. 2 in conjunction with FIG. 1, those two securing holes (11A-1) (11A-2) are aligned with each other such that both centers thereof are disposed on the same horizontal line which generally extends along the central longitudinal line of the side frame member (11).

Figure 2:
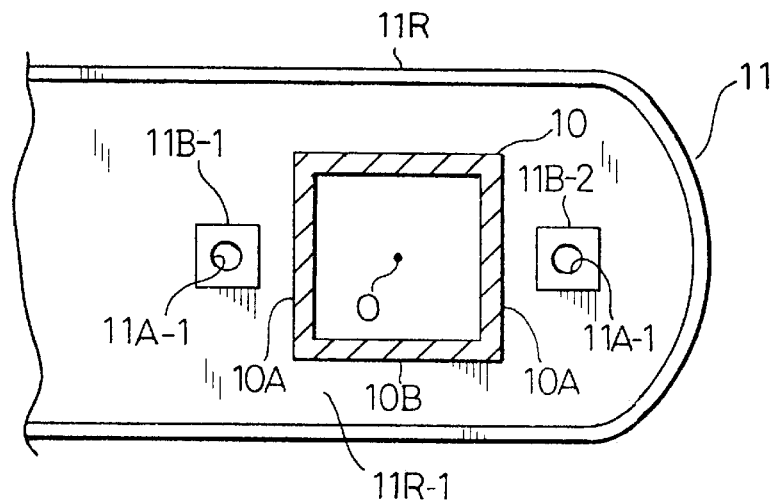
FIG. 2 is a partly broken elevation of a side frame member, which shows a principal part of the seat cushion frame structure.
Figure 3:
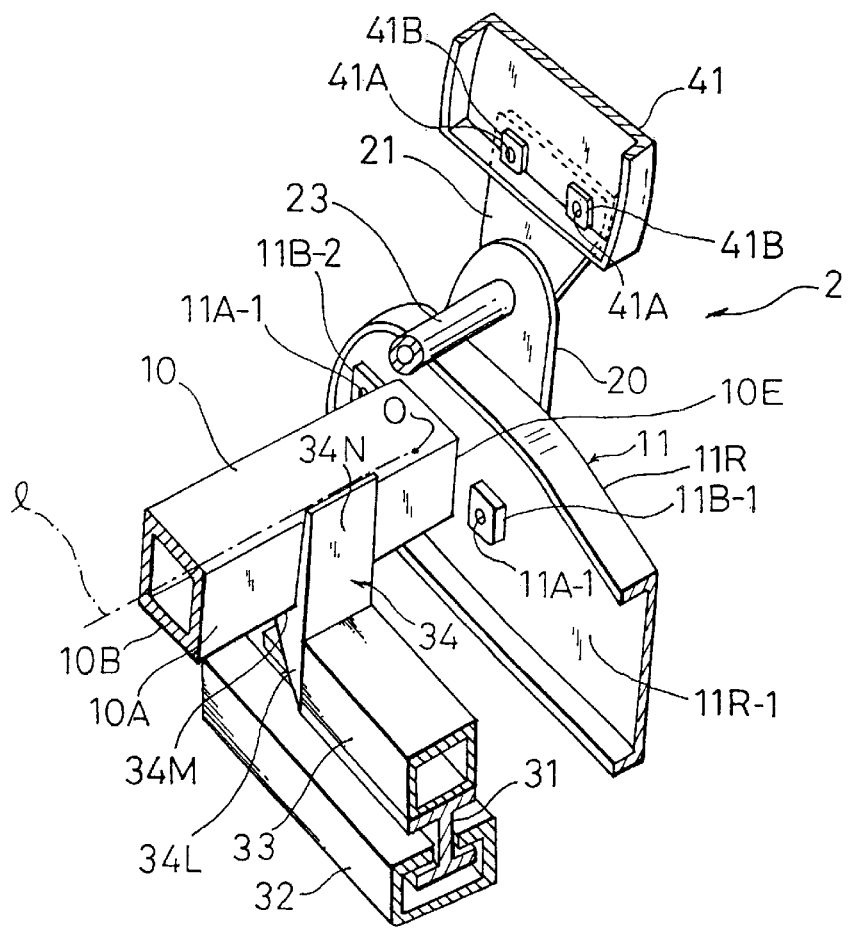
FIG. 3 is a partly broken perspective view showing a connection among the side frame member, a square backward frame member, and a slide rail device.
Figure 4:
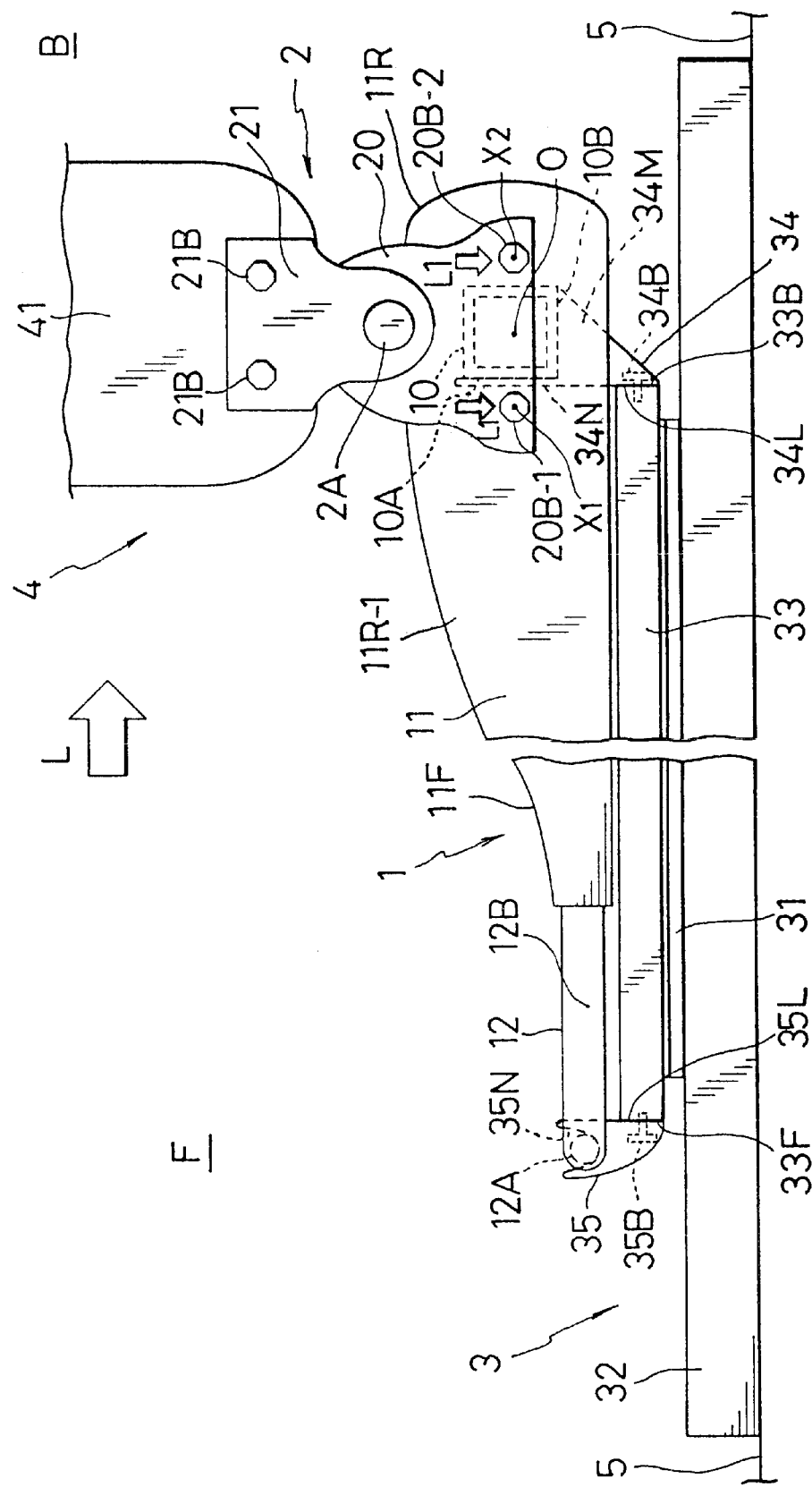
FIG. 4 is a partly broken schematic elevation view of the vehicle seat framework, which explanatorily shows how a great load applied thereto is transmitted and escaped through the principal part of the present invention.

In this context, it is noted that the term, "forward" or "forwardly", refers to a side facing forwardly of a vehicle (not shown), as indicated by (F) in FIG. 4, (i.e. a normal forward running direction of the vehicle), whereas the term, "backward" or "backwardly", refers to a side facing backwardly of the vehicle, as indicated by (B) in the FIG. 4, in a direction opposite to the forwardly facing side (F), As shown, the formation of this seat cushion frame (1) is such that the two forward end regions (11F) respectively of the side frame members (11) are each firmly connected with the respective two ends portions (12B) of forward frame member (12), whereas on the other hand, the two backward end regions (11R) respectively of the side frame members (11) are each firmly attached to the respective two ends (at 10E in FIG. 3) of the square backward frame member (10). In accordance with the present invention, each end (10E) of square backward frame member (10) is preferably disposed substantially halfway between such two spaced-apart forward and backward securing holes (11A-1) (11A-2). More specifically, in the illustrated embodiment, with particular reference to FIGS. 2 and 3, the end (10E) of square backward frame member (10) is fixedly, integrally attached, as by welding, to the vertically extending wall (11R-1) of side frame (11) at a midmost point (O) between the two centers respectively of the forward and backward securing holes (11A-1) (11A-2), with the longitudinal central axis (l) of the square backward frame member (10) extending from that midmost point (O) in a horizontal direction inwardly of the seat cushion frame (1) which is orthogonal with a vertical plane of the wall area (11R-1) of side frame member (11). In other words, the central axis (l) of square backward frame member (10) is located at the same level with both centers of the forward and backward securing holes (11A-1) (11A-2) as shown in FIG. 2. Still otherwise stated, referring to FIGS. 2, 3 and 4, the forward and backward securing holes (11A-1) (11A-2) are respectively located at two forward and backward securing points that are defined on the opposite sides of the central axis (l) of square backward frame member (10). In accordance with the present invention, it is important that such two securing points, where the reclining device lower arm (20) is fixedly secured via the two securing holes (11A-1) (11A-2) to the side frame member (11), should be situated on the same level with or adjacent to such central axis (l) of square backward frame member (10) for a reinforcement purpose as will be explained later.

Designations (35) (35) denote a pair of forward connecting brackets fixed to the main frame section (12A) of forward frame member (12). Referring to both FIGS. 1 and 4, each connecting bracket (35) includes: an upper securing recession (35N) in which the main frame section (12A) of forward frame member (12) is firmly welded; and a lower vertical securing wall (35L) which is securely fastened to the slide rail device (3) via the securing hole (35A) thereof, using a bolt (35B), as will be explained.

Designations (34) (34) denote a pair of backward connecting brackets fixed to the square backward frame member (10). As can be seen from FIGS. 1, 3 and 4, each backward connecting bracket (34) includes: first and second support portions (34N) (34M) which are respectively welded to the vertical side wall (10A) and horizontal bottom wall (10B) of the square backward frame member (10); and a lower vertical securing portion (34L) which is securely fastened to the slide rail device (3) via the securing hole (34A) thereof, using a bolt (34B), as will be explained.

As shown, in the seat cushion frame (1), the paired forward connecting brackets (35) (35) and the paired backward connecting brackets (34) (34) are disposed in a mutually faced and aligned relation with one another.

The slide rail device (3) is of a known structure comprising a pair of spaced-apart slide rail members, each being formed by a lower stationary rail (32) fixed on the floor (5) of a vehicle (not shown), and an upper movable rail (31) slidably fitted in the lower stationary rail (32) Two operating levers (36) are operatively connected between those two slide rail members via a connecting rod (37) for synchronized locking and unlocking operation of both upper rails (31) relative to the lower rails (32). Designation (33) represents a longitudinal connecting block member fixed on the upper rail (31), which not only serves to connect the slide rail member (31, 32) with the seat cushion frame member (11), but also forms an integral part of the seat cushion frame member (11) as will be understood later. The connecting block member (33) has forward and backward connecting surfaces (33F) (33B) adapted to be securely connected with the forward and backward brackets (35) (34), respectively, to connect the seat cushion frame (1) and the slide rail device (3).

Further, as viewed from FIG. 1, a pair of right and left reclining devices (2) (2) are provided between the seat cushion frame (1) and the seat back frame (4). Each of the two reclining devices (2) is basically composed of an upper arm (21) and a lower arm (20), both of which are rotatably coupled together via hinge (2A), except that the left reclining device is provided with a reclining lever (22). In both of the two reclining devices (2), the upper arm (21) is formed with a pair of securing holes (21A) which are aligned with the respective two securing holes (41A) of the side frame member (41) of seat back frame (4), whereas the lower arm (20) is formed with a pair of forward and backward securing holes (20A-1) (20A-2) which are aligned with the respective two securing holes (11A-1) (11A-2) of the side frame member (11) of seat cushion frame (1). A connecting rod (23) is extended between the left and right reclining devices (2) such that the two ends thereof are fixedly connected with the two hinge shafts (24) respectively of the two reclining devices (2).

In assembly, the seat cushion frame (1) is fixedly coupled with the two slide rail members (31, 32) of slide rail device (3). This is done by fastening the paired forward and backward connecting brackets (35) (34) of seat cushion frame (1) to the respective forward and backward connecting surfaces (33F) (33B) of longitudinal connecting block member (33) by means of two securing bolts (35B) (34B) which are passed through the respective securing holes (35A) (34A) and threadedly secured to the respective connecting surfaces (33F) (33B), as understandable from FIG. 1. Accordingly, as can be seen from FIG. 4, the seat cushion frame (1) is firmly connected via the connecting block member (33) with the upper rail (31) of slide rail device (3). It is appreciated that the two longitudinal connecting block members (33) not only become an integral part of the seat cushion frame (1) to reinforce the seat cushion frame (1) itself, but also firmly connect the seat cushion frame (1) with the slide rail device (3) or the vehicle floor (5). Of course, instead of such connecting block members (33), the top portion of the upper rail (31) may be so formed to have an integral longitudinal rigid portion that can be firmly connected between the forward and backward connecting brackets (35) (34).

As shown in FIG. 1, the upper arm (21) of the left reclining device (2) is securely coupled with the left side frame member (41) of seat back frame (4) by passing the two bolts (21B) through a pair of the aligned two securing holes (21A) (41A) respectively of the upper arm (21) and side frame member (41) and threadedly securing the two bolts (21B) in the respective two securing nuts (41A) (41A) in the seat back frame side frame member (41). On the other hand, the lower arm (20) of the same left reclining device (2) is attached to the backward region (11R) of seat cushion frame side frame member (11) so that the forward and backward securing holes (20A-1) (20A-2) of lower arm (20) are respectively aligned with the forward and backward securing holes (11A-1) (11A-2) of seat cushion frame side frame member (11). Then, the forward and backward bolts (20B-1) (20B-2) are respectively inserted through one set of the aligned holes (20B-1) (11A-1) and another set of the two aligned holes (20B-1) (11A-2). By threadedly securing the two bolts (20B-1) (20B-2) in the respective two nuts (11B-1) (11B-2) (see FIG. 2), the left reclining device lower arm (20) is firmly coupled with the left side frame member (11), as can be seen in FIGS. 3 and 4.

The same steps as in the foregoing manner are carried out in connecting the right reclining device (2) with the right side frame (11), while fixedly securing the two ends of connecting rod (23) to the respective two hinge shafts (24) (24) of the left and right reclining devices (2). Specific description is omitted about the connecting steps for the right reclining device (2) since the steps per se as well as the securing holes (41A, 21A, 20A-1, 20A-2) and bolts (21B, 20B-1, 20B-2) are entirely the same with the steps, securing holes and bolts described above for the left reclining device (2).

With the above-described structure, referring to FIG. 4, it is seen that, when a great backward load (L) is applied to the seat back frame (4), the load (L) is dispersed via the reclining device lower arm (20), and simultaneously, downward force components (L1) are generated for the load (L) and exerted upon the axes (X1) (X2) respectively of the forward and backward bolts (20B-1) (20B-2). Such downward force components (L1) are therefore immediately transmitted via the side frame member (11) to the square backward frame member (10), whereupon most of the great load (L) is received by the square backward frame member (10). The great load (L) is further immediately transmitted to the two connecting brackets (34), two longitudinal connecting block members (33) and both upper and lower rails (31) (32), and escaped to the floor (5). Accordingly, the great load (L) is not directly exerted on the side frame members (11) of seat cushion frame (1), but smoothly transmitted to the square backward frame member (10), which prevents deformation of the side frame member (11) and eliminates the need for reinforcing the same. As discussed previously, this dynamical effect are attained by the arrangement wherein the lower arm (20) of reclining device (2) is fixed at the two securing points, i.e. at the forward and backward securing holes (11A-1) (11A2) in relation to the central axis (l) of square backward frame member (10), by means of the two bolts (20B-1) (20B-2), and such two securing points are on the same level with or adjacent to that central axis (l). Furthermore, the square backward frame member (10), by the reason of its being fixed to the two connecting members (33), is provided with a path for dispersing and escaping the load (L) therethrough to the slide rail members (at 33, 32) which in turn escape most of the load (L) down to the floor (5), and therefore, any reinforcement is not required for the square backward frame member (10). Hence, the seat cushion frame (1) per se is maintained in structural strength enough to withstand the great load (L) without any additional reinforcement required, and it is possible to achieve a lightweight and simplified structure of the seat cushion frame (1) on the whole.

Finally, it should be understood that the present invention is not limited to the illustrated embodiment, but any other modifications, replacements and additions may be structurally applied thereto without departing from the scopes of the appended claims.

What is claimed is:

1. A structure of seat cushion frame in combination with a floor of vehicle, comprising:

a forward frame member which faces to a forward side of said seat cushion frame;

a square backward frame member having a generally rectangular cross-section, which faces to a backward side of said seat cushion frame, said square backward frame member including two ends and a downward side facing to said floor of vehicle;

a pair of side frame members, each having a vertically extending wall area, said pair of side frame members being securely connected between said forward frame member and said square backward frame member, such that each of said two ends of said square backward frame member is fixedly connected with said vertically extending wall area of each of said pair of side frame members, a reclining means having a pair of lower arms;

securing points defined on said vertically extending wall area of each of said pair of side frame members so as to be disposed on the forward and backward sides of said seat cushion frame in relation to said square backward frame member; and a connecting means for fixedly connecting said seat cushion frame with said floor of vehicle, said connecting means including a connecting element for fixedly connecting said square backward frame member with the floor of vehicle, said connecting element being fixed to said downward side of said square backward frame member;

wherein each of said pair of lower arms is fixedly secured to said vertically extending wall area of each of said pair of side frame members at said securing points.

2. The structure of seat cushion frame as defined in claim 1, wherein said securing points are defined on the forward and backward sides of the seat cushion frame in relation to a central axis of said square backward frame member in such a manner as to be disposed on a same level with or adjacent to said central axis of the square backward frame member.

3. The structure of seat cushion frame as defined in claim 1, wherein said connecting means includes another connecting element for fixedly connecting said forward frame member with said floor.

4. The structure of seat cushion frame as defined in claim 1, wherein each of said pair of side frame members has a backward end region facing to said backward side of he seat cushion frame, wherein said securing points are defined at said backward end region, wherein at least two bolts are used to secure said pair of lower arms, at said securing portions, to said vertically extending wall area of each of said pair of side frame members.

5. The structure of seat cushion frame as defined in claim 1, wherein said reclining means further includes a pair of upper arms to be connected with a seat back frame, said pair of upper arms being operatively connected with said pair of lower arms, respectively.

6. The structure of seat cushion frame as defined in claim 1, wherein said connecting means includes:

another connecting element for fixedly connecting said forward frame member with said floor; and a longitudinal block body having one end securely connected with said one connecting element and another end securely connected with said another connecting element.

7. A structure of seat cushion frame in combination with a floor of vehicle and a slide rail device to be fixed on the floor of vehicle, comprising:

a forward frame member which faces to a forward side of said seat cushion frame;

a square backward frame member having a generally rectangular cross-section, which faces to a backward side of said seat cushion frame, said square backward frame member including two ends and a downward side facing to said floor;

a pair of side frame members, each having a vertically extending wall area, said pair of side frame members being securely connected between said forward frame member and said square backward frame member, such that each of said two ends of said square backward frame member is fixedly connected with said vertically extending wall area of each of said pair of side frame members, a reclining means having a pair of lower arms;

securing points defined on said vertically extending wall area of each of said pair of side frame members so as to be disposed on the forward and backward sides of said seat cushion frame in relation to said square backward frame member; and a connecting means for fixedly connecting said seat cushion frame with said slide rail device, said connecting means being defined integrally in said slide rail device and including a connecting element for fixedly connecting said square backward frame member with the slide rail device, said connecting element being fixed to said downward side of said square backward frame member;

wherein each of said pair of lower arms is fixedly secured to said vertically extending wall area of each of said pair of side frame members at said securing points.

8. The structure of seat cushion frame as defined in claim 7, wherein said securing points are defined on the forward and backward sides of the seat cushion frame in relation to a central axis of said square backward frame member in such a manner as to be disposed on a same level with or adjacent to said central axis of the square backward frame member.

9. The structure of seat cushion frame as defined in claim 7, wherein said connecting means includes another connecting element for fixedly connecting said forward frame member with said floor.

10. The structure of seat cushion frame as defined in claim 7, wherein each of said pair of side frame members has a backward end region facing to said backward side, wherein said securing points are defined at said backward end region, wherein at least two bolts are used to secure said pair of lower arms, at said securing points, to said vertically extending wall area of each of said pair of side frame members.

11. The structure of seat cushion frame as defined in claim 7, wherein said reclining means further includes a pair of upper arms to be connected with a seat back frame, said pair of upper arms being operatively connected with said pair of lower arm, respectively.

12. The structure of seat cushion frame as defined in claim 7, wherein said connecting means includes:

another connecting element for fixedly connecting said forward frame member with said slide rail device; and a longitudinal block body having one end securely connected with said connecting element and another end securely connected with said another connecting element.

* * * * *